United States Patent [19]
Chamberlain

[11] Patent Number: 4,675,107
[45] Date of Patent: Jun. 23, 1987

[54] TILTING PAN FILTERS

[75] Inventor: Donald L. Chamberlain, Baton Rouge, La.

[73] Assignee: Freeport Minerals Company, New York, N.Y.

[21] Appl. No.: 754,410

[22] Filed: Jul. 12, 1985

[51] Int. Cl.⁴ ............................................. B01D 35/08
[52] U.S. Cl. .................................... 210/232; 210/328; 210/330; 210/344; 210/345
[58] Field of Search ........... 210/232, 328, 330, 333.01, 210/333.1, 344, 345, 347, 450, 479

[56] References Cited

U.S. PATENT DOCUMENTS

| | | | |
|---|---|---|---|
| 3,139,404 | 6/1964 | Stock | 210/328 |
| 3,216,576 | 11/1965 | Roos | 210/328 |
| 3,327,860 | 6/1967 | Lyle, Jr. et al. | 210/328 |
| 3,373,873 | 3/1968 | Parmentier | 210/328 |
| 3,389,800 | 6/1968 | Roos | 210/328 |
| 3,426,909 | 2/1969 | Garner | 210/328 |
| 3,830,658 | 8/1974 | Davister | 210/328 |
| 4,172,791 | 10/1979 | Davister | 210/328 |
| 4,391,706 | 7/1983 | Steinkraus | 210/330 |
| 4,430,404 | 5/1982 | Davister | 210/328 |
| 4,547,288 | 10/1985 | Little | 210/330 |

FOREIGN PATENT DOCUMENTS 238157  1/1964  Netherlands ..................... 210/328

*Primary Examiner*—Peter A. Hruskoci
*Attorney, Agent, or Firm*—Fisher, Christen & Sabol

[57]  ABSTRACT

Tilting filter pans having generally parallel leading and trailing sidewalls which are sloped at an angle to permit increased filtration rates for a predetermined filtering efficiency, and also to permit increased filtering efficiency where the feed rate is constant. Drainage of the pans may also be improved. The feed is a slurry from which the liquid is removed, and the filter cake is dumped by rotation of each filter pan at a predetermined point of movement of the filter pan along a cyclical path.

20 Claims, 13 Drawing Figures

TILTING PAN FILTERS

BACKGROUND OF THE INVENTION

This invention relates to tilting pan filters which travel in a continuous cyclical path and which are capable of rotating about an axis perpendicular to the direction of pan travel for discharge of filter cake. This invention is used for separating a slurry into particulate matter and liquid.

The invention particularly relates to tilting pan filters which are used in the wet-process phosphoric acid industry. The filter cake which is to be discharged is composed of gypsum. In the wet-process phosphoric acid plants it is to return some of the filtrate recovered during dewatering to rinse filter cake during various portions of the filtering cycle. The balance of the filter liquid represents product acid. The tilting pan filters of the present invention and shown in the prior art described hereunder are used for the countercurrent washing recovery of phosphoric acid from gypsum.

It is known in the art to use tilting pan devices for filtering particulate matter from liquid. In these prior art devices, liquid is supplied to consecutively cover a filtering surface of each pan, with a source of vacuum being connected to an opposite side of the filtering surface, to draw liquid therethrough. During each cycle, liquid is drawn through the filtering material leaving only the filter cake behind. Additional steps, such as washing using recycled liquid, are also known in the prior art.

The prior art filter pans as described above have several drawbacks. The prior art filtering pans have sidewalls opening outwardly along both the forward and the trailing edges, which arrangement does not provide either the maximum filtering area possible, or the maximum volume for filter cake, since the dead space between pans is not minimized. This prior art type of arrangement leads to inefficiencies due to lower liquid velocity through the filter cake, and to greater liquid viscosity losses. For a predetermined plant size, reduced filtration, or alternatively a lower quality of filtration efficiency results (defined as the rate at which particulate material is removed from the liquid), in the prior art devices.

Another drawback of the prior art devices is the splashing of feed liquid and wash liquid as it flows in a wave about the pan before losing the kinetic energy imparted during feeding. The sidewalls on prior art pans do not contain the liquid to the maximum extent possible, as they generally scope outward on both the forward and trailing edges. Liquid and slurry can fall between pans, reducing filtration rate and efficiency and increasing maintenance requirements.

A tilting motion is necessary in order to empty a filter pan of the filter cake at the end of each cycle. The outwardly-opening sidewalls of the prior art are thought to facilitate discharge of the filter cake.

It is a problem with prior art pans that they do not drain the filtered liquid out of the pan body rapidly, since the axis of the pan is the drain point. A pan whose filtering surface is close to the axis will not drain quickly as there can be little slope on the surfaces on which the liquid moves to the drain point. However, the pan may be in close proximity to its neighbor, as the radius of the circle on which the pan moves as it tilts is relatively small, reducing the potential filtration area wasted to prevent interference with the neighbor. A pan whose filtering surface is further away from its axis can be made to drain more quickly but the radius of the turning circle is larger, requiring more wasted area between pans to prevent interference. It is desirable for pans to drain quickly as this increases filtration rates, reduces product contamination with wash liquids, and improves filtration efficiency.

Furthermore, cloth filters are used over a liquid-pervious support bed as the filtering medium in the prior art. Hold-down devices are employed along the edges of pans, about which the cloth is wrapped. The hold-down devices are tensioned by tensioning devices mounted to the side and end walls of the pans. The hold-down devices of the prior art are relatively bulky and occupy a volume which causes the filter cake height to be increased for a given mass of filter cake. This increased cake height causes losses in filtering efficiency due to decreased fluid velocity caused by increased liquid viscosity frictional losses. It is therefore a problem with the prior art devices that hold-down devices having a relatively large volume are employed for tensioning the filtering cloth.

It is therefore a problem in the art to efficiently use the maximum filtering surface available relative to the volume of space swept cyclically by the filtering surface of each filter pan. It is also a problem in the prior art devices to permit tilting and rotating of each filter pan about a radial axis to the path of travel of the pan, to permit emptying of filter cake from each filter pan. Typical of the prior art filter pan devices are those discussed hereunder.

The Davister U.S. Pat. No. 4,330,404 is an illustration of the typical prior art pans, their function, and their accessory equipment. It teaches use of multiple filter pans traveling through a circular arc in a horizontal plane, which are rotatable about a radial pan axis to discharge the filter cake by-product, which does not pass through the filter materials. The pan then returns to an upright position to receive more fluids to be filtered. Washing or rinsing cycles can be used to increase the efficiency and/or quality of the filtering process. Clearance is maintained between each of the tilting pans, to permit the rotation about the radial axis of each pan during discharge of filter cake.

In the patent to Steinkrause, U.S. Pat. No. 4,391,706, a filter element sealing device for a filter pan is shown in FIGS. 4 and 6. This device is of a resilient material and is generally L-shaped. It is held down by a hold-down arm which is held in place against a wall of the filter pan by a wedge.

In U.S. Pat. No. 3,830,658, to Davister, a method and device for washing a continuous filter is shown. This invention teaches cleaning of tilting filter pans wherein wash water is used to scour the filter material while the filter pan is inverted, the wash water being supplied between the bottom of the tilting filter pan and the filter material.

In U.S. Pat. No. 4,172,791, to Davister, a multiple cell filter having a gas discharge is taught. The gas discharge is shown in FIG. 8, and in FIG. 1 an entire schematic diagram of the liquid-removal system employing a vacuum is shown.

In the patent to Lyle, Jr., et al, U.S. Pat. No. 3,327,860, a tilting pan filter drain valve is shown. This valve is shown in FIG. 3, and provides a selectively openable drain in the filter pan.

In U.S. Pat. No. 3,389,800 to Roos, a tilting pan filter having a residual filtered liquid trap is shown. In another patent issued to Roos, U.S. Pat. No. 3,216,576, a filter pan structure is taught.

In U.S. Pat. No. 3,139,404, to Stock, a tilting filter pan device is shown having filter support structural details as well as a means for causing rotation of the tilting filter pans, namely rollers 50,52 in FIG. 1.

In U.S. Pat. No. 3,426,909 to Garner, a support grid for a filter pan is shown.

SUMMARY OF THE INVENTION

By the present invention, increased filter surface area in a tilting pan filter is achieved. That is, for a given volume swept by any of the tilting filter pans, available filter surface area is increased significantly, as compared to the prior art, without preventing the pan tilting which is necessary to discharge filter cake material. Available volume is also increased for the reception of the filter cake material.

Also by the present invention, filter cake height is decreased in each filter pan, by the inventive tilting filter pan shape which improves filtration rates and efficiency at any set of operating conditions, and by the filter hold-down device.

Also by the present invention, the slope on the surfaces moving filtered liquids to the pan drain point may be increased without as large a penalty in wasted area between pans. Filtration rate and efficiency are not penalized while product contamination with wash liquids is reduced significantly.

The inventive filter pan and hold-down apparatus combine to minimize cake thickness at any set of operating conditions, and to maximize filtration rates.

The inventive filter pan shape reduces fluid flow splashing from one pan to another, producing instead a "backwave" at the trailing sidewall to redirect the liquid back to the filter pan in which the liquid was originally poured, thus quickly dissipating fluid transverse kinetic energy.

The present invention involves an improved tilting pan design wherein the cross-sectional outline of each pan forms the general shape of a parallelogram. The tilting pans are generally arranged in an apparatus so as to have the shape of a circle, the segments being truncated at a region near the center of the circle to form a generally hollow interior space among them. This parallelogram-shaped pan cross-sectional outline has distinct advantages over the prior art pan shapes. First, this results in increased capacity in use in a pre-existing plant, since there is less wasted space between the pans at the surface of the filtering medium itself. This shape also does not prevent tilting of the pans to discharge the contents, as discussed hereunder. An alternative advantage of the use of the present invention is a better quality of filtration. The present inventive tilting pan yields reduced cake height, as well as increased area available for filtering, as compared to the prior art pans.

An advantage of increased capacity in a preexisting plant is the greater feed rate possible. In one example of the present invention, there would be theoretically an 8.4% increase in filtration capacity. This figure takes into account the inventive pan shape and the hold-down device used which takes up less volume than the hold-down devices of the prior art.

In the present invention, clearance between pans can be kept at approximately one inch or less along the height of the adjacent sidewalls, whereas in the prior art pans the minimum clearance might, for example, be one inch at the top of the pans and 3 to 4 inches at the bottom of the pans, due to the prior art pan shape, resulting in reduced filtering surface available at the bottom of the pans. Also, the inventive pans preferably have a sloped lower liquid collection surface to facilitate drainage of the filtered liquid. With the inventive pans the drainage slope may be greater without having to increase the area between pans to prevent interference during tilting.

Tilting of each pan is individually caused by two separate wheels mounted to the pans by a shaft, by a connecting member, the shaft supporting the tilting pan during rotation thereof. Each wheel extends at a different distance from the tilting pan end wall. Thus, each wheel can follow a separate cam path which causes timed tilting of each individual pan both to empty the pan filter and to move adjacent pans in timed relationship to avoid collisions, as necessary.

The rotation axis of each pan does not underlie the gravitional center of the pan. The trailing edge is heavier than the leading edge due to the weight of the pan itself and the cake thereon, which facilitates tilting of the pans since the initial tilting motion is performed by gravity. When returning the pan to its original position, much less energy is expended since the pan is then empty and there is less weight and less rotational inertia to be overcome. In the present design, the trailing edge rotates downwardly through approximately 180° and returns back to its upright position in a reversed rotational direction, thereby preventing twisting of connecting hoses by more than 180°, the connecting hoses being used to provide suction and to drain the fluid which is filtered.

A specific liquid and particulate material have been successfully used in the present invention. In particular, a pumped slurry is supplied to each filter, generally containing phosphoric acid with entrained gypsum as a by-product. The present invention is not limited thereto, and use with other materials and liquids is contemplated as being within the scope of the present invention. Each tilting pan filter has a cloth overlying a perforated plate to support the cloth, a vacuum system for drawing liquid through the filter, and hold-down device for maintaining tension in the cloth to keep the cloth stretched. Even though the trailing side wall of each individual tilting filter pan is angled inwardly, and thus tends to overlie a portion of the filter cake, discharge of the filter cake is not inhibited. Thus, the present invention achieves the result of the prior art filter pans, namely the complete discharge of filter cake at the end of each cycle, while increasing maximum filtration capacity. In the prior art devices and in the present invention, washing liquid is applied to the filter surface while the filter pan is inverted in order to clean the entire filter surface area.

Further details and advantages of the present invention appear from the following description of a preferred embodiment shown schematically in the drawings.

DETAILED DESCRIPTION OF THE INVENTION

Figure 1:
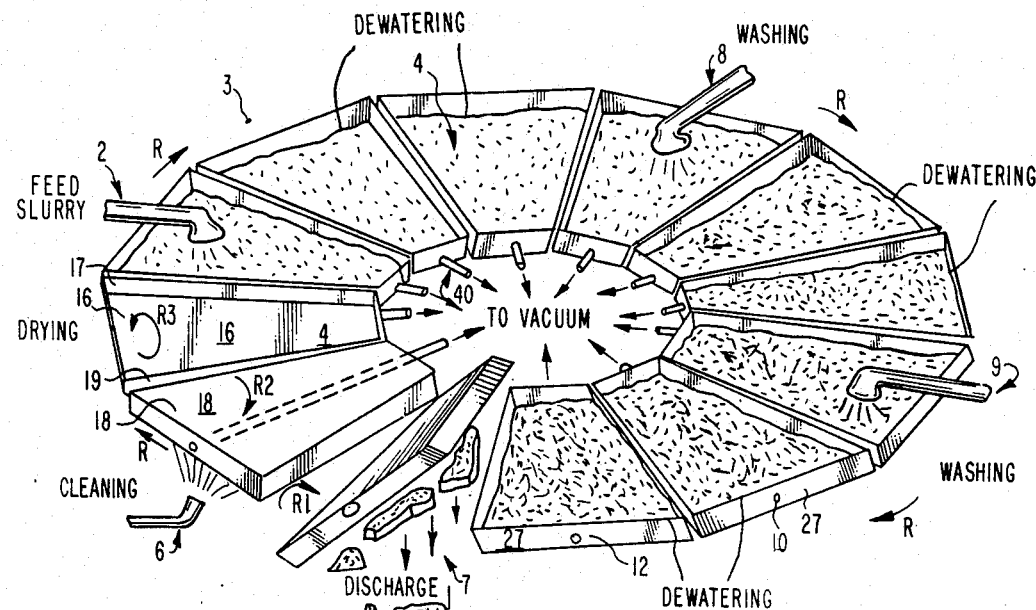
FIG. 1 is a diagramatic perspective view of a rotating assembly of tilting filter pans.

FIG. 1 is a diagramatic perspective view of a rotating filter pan device with individual tilting pans 3 being brought cyclically into various stations. As seen in FIG. 1, a feed slurry supply 2 provides a slurry to each individual filter 3, the slurry generally containing phosphoric acid with entrained gypsum as a by-product. Each pan 3 has a filtering medium 16 therein, atop which the slurry initially rests. A discharge conduit 40 is connected with a source of vacuum to rapidly draw the liquid portion of the slurry through the filtering medium. This is called "dewatering".

Upon dewatering, a filter cake 4 remains in the filter pan. The filtering efficiency and the nature of the slurry substantially determine the amount of time required for substantial dewatering of the filter cake 4. The pans cycle at a rotational velocity R, as indicated by the arrows in FIG. 1. The rotational velocity R, expressed in units of degrees per second, or radians per second, determines the amount of time each filter pan 3 spends in passing from one station to the next. The amount of slurry filtered is dependent upon the feed rate from the feed slurry supply 2, which in turn must be limited by the capacity of the tilting filter pan system.

A washing supply conduit 8 is shown in FIG. 1, which recycles liquid that has been drawn off during a dewatering portion of the cycle to further reduce entrained solids in the filtered liquid and to control acid concentration in the filtered liquid, during a second filtering stage. This washing step is followed by dewatering. Another washing step can be provided, as indicated by washing supply conduit 9. This would also be followed by a dewatering step. Each filter pan undergoes filtering steps, and may also undergo, if desired, additional washing steps, special treatments of varying kinds, and drying steps.

After the final dewatering stage, the filter cake 4 is removed by inversion of each filter pan 3 so as to form a discharge 7. The rotation of the individual filter pan is indicated in FIG. 1 as R1, and rotates about an axis which in FIG. 1 would be a radius of a circle defined by the travel of the filter pans 3.

Rotation continues until the filter pan 3 is completely inverted, as indicated by the continued rotation R2. All of the discharge 7 is removed from the pan 3, first by gravity then by a cloth blow segment, and then by a cleaning spray 6. The cloth blow segment of travel uses air to discharge the remaining filter cake as is known in the art. The cleaning spray removes all of the filter cake 4 and washes the filtering medium. The filter pan 3 then rotates back to an upright position as indicated by arrow R3. Thus, an initial rotation of approximately 180° occurs in a first rotary direction for discharge, and then the pan is returned to its upright position by retracing the original rotation, as indicated by the arrows in FIG. 1. The cycle then starts anew as the filter pan passes beneath the feed slurry supply 2.

As seen in FIG. 1, shafts 10 are shown which are connections for members which are acted upon to cause rotation of the individual filter pans. This structure is shown in the succeeding figures. Also in FIG. 1 is seen the filtering medium surface 16 which is clean. The inventive shape of the individual tilting filter pans is evident in FIG. 1, and is shown in detail in the following figures.

Figure 2:
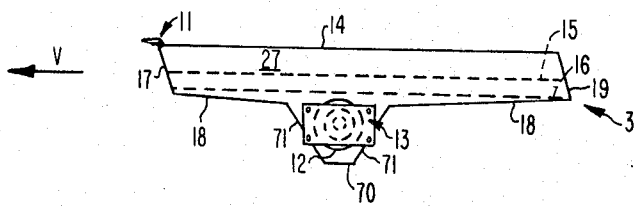
FIG. 2 is an end elevational view of an individual tilting filter pan.

FIG. 2 is an end elevational view of a tilting filter pan 3 according to the present invention. As seen in FIG. 2, the tilting filter pan 3 has a parallelogrm-shaped cross-section with a leading sidewall 17 and a trailing sidewall 19. The sidewalls 17 and 19 are generally parallel to one another in said cross-section, and are disposed, preferably, at a 15° angle to the vertical. The particular angle is an oblique angle of at least about 8° from the vertical axis of the filter pan body and is determined by considering the radius of the circle transcribed by the trailing edge of the pan as it tilts and the clearances desired with the following pan. The tilting filter pan 3 has top wall edges 14 and a bottom pan wall 18. A hollow shaft 12 is seen in section in FIG. 2, and a face plate 13 is seen which mounts the shaft 12 in place.

Figure 5:
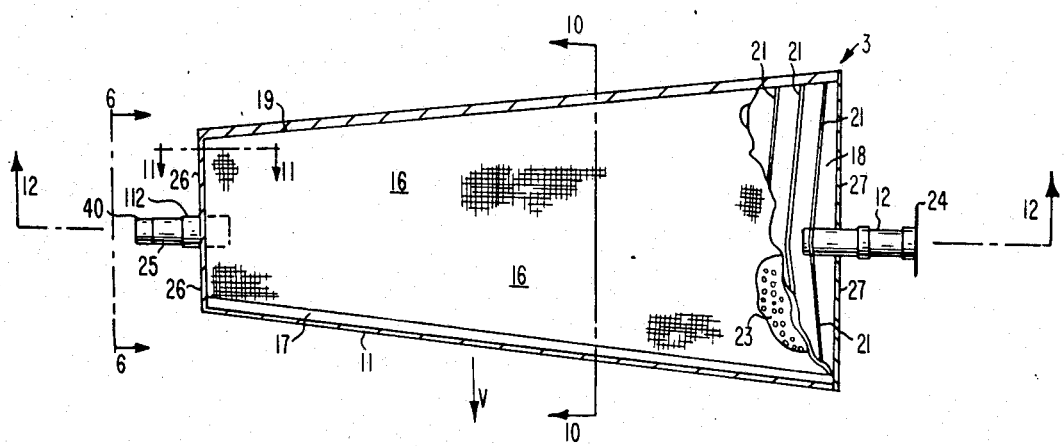
FIG. 5 is a top elevational view, partially broken away, of a tilting filter pan according to the present invention.

The filtering medium 16 is seen in dotted outline in FIG. 2. The filtering medium 16 is preferably a cloth sheet composed of a fabric suitable for filtering. Such filtering mediums are well known in the art. The fabric sheet is supported by a liquid-permeable member, known in the art, for supporting the filtering medium 16. The support is shown in FIG. 5 as perforated plate 23. A typical maximum filter cake height 15 is indicated in dotted outline in FIG. 2. Also as seen in FIG. 2, a "shroud" 11, attached to sidewall 17, is provided for preventing spillage of feed slurry between any two adjacent filter pans 3. The shroud 11 overlaps the gap between adjacent filter pans.

The filter pan 3 of the present invention is preferably formed of metal such as stainless steel, steel, aluminum, or the like, or of reinforced plastic, composite plastic materials, or any other materials sufficiently strong for supporting a filtering medium for filtering. Also, any filtering medium 16 can be used which is known in the art, besides the fabric having a planar support of the present invention. All such variations are contemplated as being within the scope of the present invention.

As seen in FIG. 2, the filter pan 3 has an instantaneous linear velocity V. The magnitude of this velocity V can be determined from the rotational velocity R, by multiplying the rotational velocity R by the linear distance from the center of the circle about which during its travel from one station to another in the cycle shown in FIG. 1.

Typical apparatus dimensions are described hereunder for purposes of illustration only. Any variation in size, proportions, and scale are contemplated as being within the scope of the present invention. The pans 3 travel about a circular path having a radius at the outermost pan end in a range of approximately 350 to 386 inches. The pan width at the filter medium 16 at the pan end 27 shown in FIG. 2 is approximately $73\frac{7}{8}$ inches. The pan depth from the top pan edge 14 to the filtering medium surface 16, as seen in FIG. 2, is approximately 8 inches. The shafts 12 of adjacent pans are spaced on centers at a distance of approximately 75-11/16 inches. The distance, as seen in FIG. 2, from the vertical centerline of the shaft 12 to the left-most edge of the filtering medium 16 is approximately $33\frac{5}{8}$ inches. The distance, as seen in FIG. 2, from the vertical centerline of the shaft 12 to the right-most edge of the filtering medium 16 is approximately $40\frac{1}{4}$ inches. The distance, as seen in FIG. 2, from the horizontal centerline of the shaft 12 to the plance of the filtering medium 16 is approximately $6\frac{1}{8}$ inches.

Figure 3:
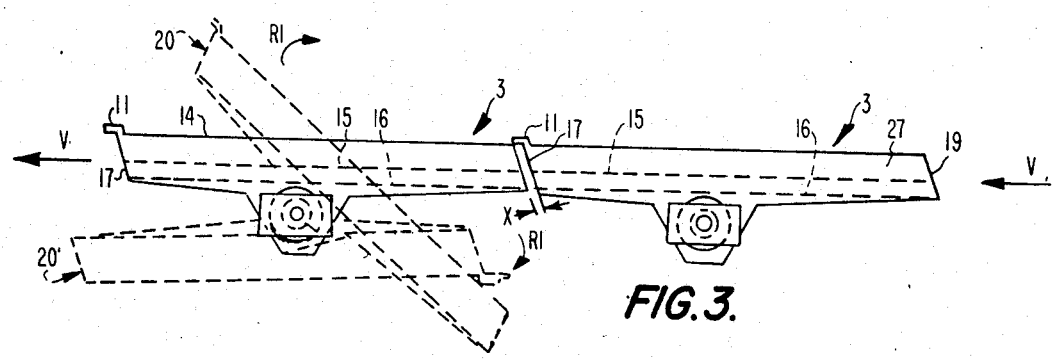
FIG. 3 is an end elevational view of a pair of tilting filter pans showing rotating of one of the tilting filter pans about an axis.

FIG. 3 is an end elevational view of adjacent tilting filter pans as used in the system of FIG. 1. These ends also move with an instantaneous linear velocity V, as described above with reference to FIG. 2. The gap between adjacent filter pans is indicated as X in FIG. 3. The gap X is generally constant from the upper-most edge 14 of the adjacent sides 19, 17 of the filter pans 3, along the respective sidewalls 19, 17, to the lower-most edges of the respective sidewalls. This gap can be made almost arbitrarily small if the adjacent filter pans are precisely manufactured. In the preferred embodiment, the gap X is approximately one inch in magnitude.

The rotation of the leading filter pan 3 is indicted in dotted outline in FIG. 3. As seen, the tilting filter pan rotates in a direction R1 as indicated at 20 under its own weight. That is, the center of gravity of the tilting filter pan 3 does not directly overlie the center of the shaft 12, but rather lies to the right of a vertical line containing the center of the shaft 12, the direction taken from FIG. 3. Thus, gravity causes the rotation R1 to the position 20 shown in FIG. 3. The rotation R1 continues under the influence of gravity and also under the action of an external rotating means, conventional in the art, such as a cam arrangement or the like, until the filter pan 3 is completely inverted in a position 20', which position is also shown in dotted outline in FIG. 3.

Due to the parallelogram-shaped cross-sectional outline of each tilting filter pan 3, it is possible to space the adjacent filter pans 3 relatively closely together over the whole height of the sidewall without risk of damage to adjacent filter pans during rotation. The bottom wall 70 beneath the shaft 12 has sidewalls 17, 19 as seen in FIG. 3 which provide structural support and which contain a fluid drainage area shown in subsequent FIG. 12.

Figure 3A:
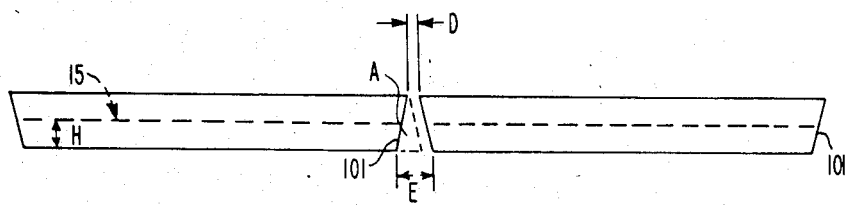
FIG. 3A is an end elevational view of a pair of prior art pans, showing in dotted outline the additional volume provided by the present invention.

FIG. 3A is an end elevational view of a pair of prior art tilting filter pans which are conventionally used. In these types of pans, due to the shapes of the adjacent pans, a distance D of approximately one inch or more separates the top edges of the pair of prior art filter pans, whereas a much larger distance E separates the bottom-most edges of the tilting filter pans. The distance E is typically three to four inches. The sidewalls in the prior art pans are angled outwardly, in at least one example at an angle of approximately 13°. This results in a waste of an area indicated in FIG. 3A as an area A bounded by the solid sidewall 101 and the dotted lines. This area A shown in FIG. 3A represents the volume available with the present pan design which is not available in the prior art. Thus, in the present invention, the cake height is reduced, and the filtering area is increased in the filter pan of the present invention, as indicated by the area A, over the prior art. The filter cake height also affects the filtering efficiency and filtering capacity.

Thus, as seen in FIG. 3A, there is a relatively large increase in volume available for a cake height H as seen in FIG. 3A, which is available in the present invention (but not in the prior art pans) for filling by the filter cake 4. This additional volume available for filling, which is disproportionately great at the bottom of the area A than at the top, reduces filter cake height H required for a given mass of filter cake 4. This is also highly desirable since it contributes to reduced cake height.

Filtration capacity and filtration efficiency are both affected by filter cake height H. By the present invention, cake height H is decreased for a predetermined mass of filter cake in each pan, thereby increasing filtration efficiency. Alternatively, where increased filtration capacity is desired, the present invention permits such increased capacity without a corresponding increase in cake height H, thus permitting for example an existing plant to filter an increased amount of feed slurry 2 as compared with a prior art filter pan design. By the present invention, cake height is minimized and filtration rates are maximized, under any set of operating conditions.

Figure 4:
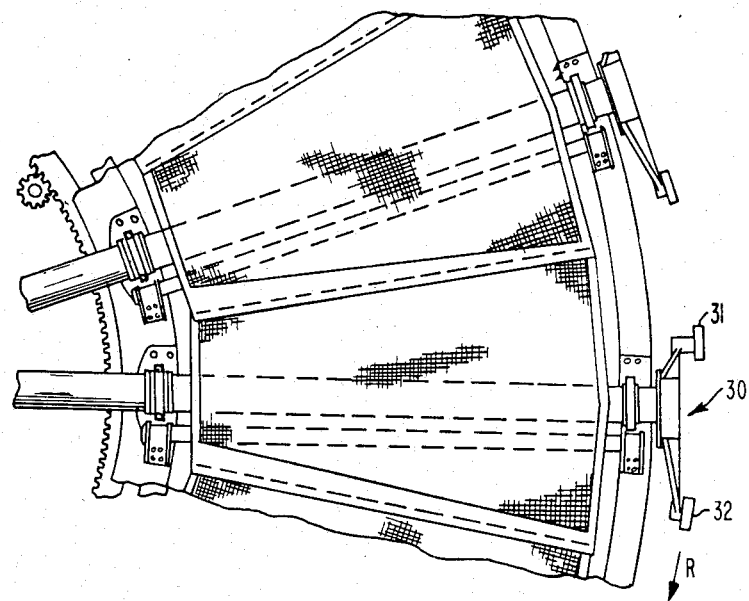
FIG. 4 is a top elevational view of a prior art tilting filter pan including a mechanism for rotating the tilting filter pan about an axis.

FIG. 4 depicts a prior art type of filter pan having a means 30 for rotating the tilting filter pans. The means 30 has rollers 31, 32 disposed at opposite ends of lever arms. The rollers 31, 32 contact cam paths which control the amount of the tilting and rotational direction thereof, of each individual filter pan. The filter pans are much heavier when they are full of filter cake, and are therefore much more difficult to turn. Thus, the center of gravity of the individual filter pans is offset toward the trailing edge somewhat, so that gravity causes turning in the rotational direction R1 as the filter pans fill up with filter cake 4. Thus, while the pan is empty a cam member, for example, would contact the roller 32 to prevent tilting of the filter pan under its own weight. This force would be relatively slight, compared with the force involved when the filter pan is full of filter cake 4. This arrangement takes advantage of the fact that a return means, such as cams and rollers, are required to return the filter pan to its upright position once it is empty. When empty, the filter pan requires much less energy and much less force upon the rollers 31, 32 in order to return the filter pan to its upright position.

The filtration capacity and filtration efficiency can be calculated theoretically from known principles and can be compared for the prior art pans and the present inventive pan. The present inventive pan has a theoretical filtration capacity increase of approximately 8.4% as compared to the prior art pans shown in FIG. 4. An equation used to calculate pressure differential across the filter cake is: delta-$P = (32\ L\ (mu)\ u)/(gD^2)$. This formula, well-known in the fluid mechanical arts, indicates that for a given driving force, the filtration rate increases as the height of the cake decreases.

FIG. 5 is a top elevational view of an individual filter pan according to the present invention. The shaft 12 is seen through a cut-away portion of the filter surface 16 and support surface 23. Ribs 21 support the relatively thin support surface 23 for structural stability. Holes formed in the support surface 23 can be used to permit passage of liquid therethrough. An end flange 24 is seen attached to the conduit 12, and the lower surface 18 of the filter pan 3 is seen in elevation in FIG. 5.

The conduit 40 has a first enlarged portion 25 and a second enlarged portion 112 as seen in FIG. 5. The conduit 40 is connected to a region of reduced pressure, which is at less than atmospheric pressure, to cause a pressure difference to exist between the top of the filter 16 and the underside of the support surface 23 so that increased liquid flow results. The interior side of the sloped wall 17 is visible in FIG. 5, while the exterior side of the sloped sidewall 19 is visible in FIG. 5. The left and right end walls 26, 27 respectively are shown in FIG. 5. The shroud 11 is seen on the leading edge 17 of FIG. 5. The velocity V of the filter pan 3 of FIG. 5 is indicated by the arrow in FIG. 5.

Figure 6:
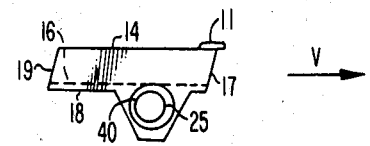
FIG. 6 is an end elevational view of the tilting filter pan as taken along line 6—6 of FIG. 5.

FIG. 6 is an end elevational view of the small end wall 26 as seen along line 6—6 of FIG. 5. Here, the shroud 11, and upstanding sloped sidewalls 17, 19 are seen. The direction of travel of the small end 26 is indicated by the arrow labeled v. The conduit 40 is seen as having a circular outline in FIG. 6. The filter surface 16 is indicated in dotted outline in FIG. 6.

Figure 7:
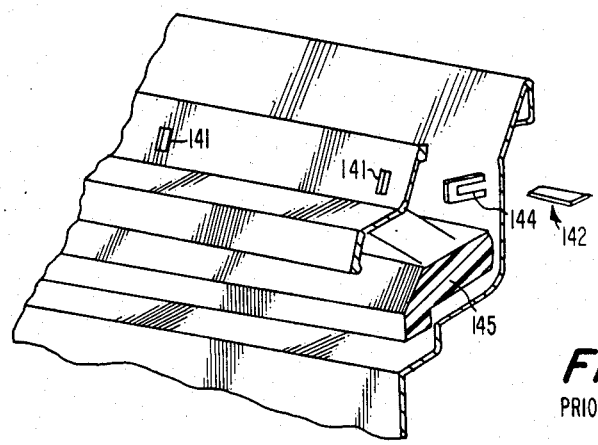
FIG. 7 is a perspective view of a prior art hold-down device.

FIG. 7 is a perspective view of a hold-down device used in the prior art. In this figure, openings 141 receive a projecting member therein, with a wedge member 142 being inserted through the projecting member once it has passed through the openings 141. The assembly of the parts in FIG. 7 is indicated by assembly lines in the figure. A resilient member 145 is seen in the figure, for holding a cloth or fabric filtering medium stretched across the filter pan bottom.

Figure 8:
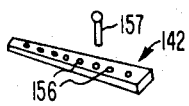
FIG. 8 is a perspective view of a wedge and pin used in the prior art hold-down device of FIG. 7.

FIG. 8 is a perspective view of the wedge member 142 of the prior art. In the type of wedge member, openings 156 are adapted to receive a pin 157 for retaining the wedge member 142 in place.

Figure 9:
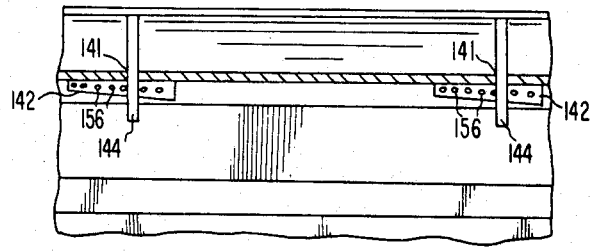
FIG. 9 is an elevational view of the prior art device shown in FIG. 7 as assembled with the wedge of FIG. 8.

FIG. 9 is a view of the apparatus of FIGS. 7 and 8 as assembled together, as seen from a vertical position. The projecting members 144 are shown as passing through the openings 141, whereby the wedge members 142 are driven in place for a tight and secure fit, which tends to compress the resilient member 145.

Figure 10:
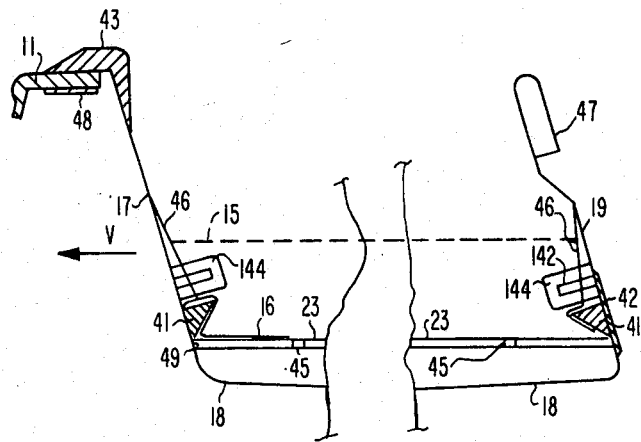
FIG. 10 is a cross-sectional view, with a middle portion broken away, of the filter pan as taken along line 10—10 of FIG. 5.

The prior art hold-down member occupies a relatively large volume as compared to that of the present invention. This relatively large volume is undesirable since the large volume occupied causes a reduction in filtration capacity and filtration efficiency due to increased cake height, as discussed above. FIG. 10 shows the hold-down device of the present invention, wherein elongated triangular insert members 41 are used instead of the L-shaped insert members 145 of the prior art. The elongated members 41 can run the length of each pan sidewall and end wall, if desired, or smaller lengths can be used. FIG. 10 is a cross-sectional view of the filter pan 3 as taken along line 10—10 of FIG. 5. An arrow V indicates the direction of travel of the filter pan.

In FIG. 10, the filter cloth 16 is shown as wrapping around the insert member 41. The cloth 16 is broken away in FIG. 10 to avoid cluttering the figure, and extends to the other hold-down devices as well. The liquid-pervious support wall 23 is seen in FIG. 10 as having holes 45 therein. Arms 46 are seen adjacent and attached to respective sidewalls 17, 19. The arms 46 are attached along their upper-most ends to the respective sidewalls 17, 19 by welding. They may also be connected as by bolts, rivets, or the like. The shroud 11 is seen in cross-sectional outline in FIG. 10, with a support member 48 attached thereunder and a vertical rib 43 connecting the shroud 11 to the sidewall 17. The trailing sidewall 19 is curved into a closed path 47 for structural integrity.

The structural details of the tilting pan 3 are as follows. A ¼ inch support plate 23 is used to support a filter cloth 16 stretched above it, the support plate 23 being supported by a metal grid having ribs 50 spaced approximately one foot apart to hold the support plate up. The support plate 23 has a plurality of holes therein to permit drainage of fluid through the filter cloth 16. The fabric 16 is stretched by using a triangular wedge 41 under a hold-down member 46, the hold-down member 46 being preferrably tensioned by use of a wedge member 142 driven into a projecting metal loop 44. The loop 44 is preferably metal, which is welded to the respective sidewall. However, any number of other hold-down devices could be used within the scope of the present invention. The loops 44 used are welded at an approximately twelve inch spacing.

The Steinkrause patent, U.S. Pat. No. 4,391,706, is discussed hereinabove for showing a particular hold-down device as seen in FIGS. 7–9 which employ a similar loop and wedge. The prior art rubber member has a generally L-shaped profile as seen in FIG. 7, and takes up more volume than does the triangular hold-down member of the present invention. Thus, although the prior art rubber member does not take up filtration area, it increases the cake height. Such increase in the cake height decreases filter efficiency, as explained hereinabove, and therefore the generally triangular cross-sectional shape hold-down member 41 of the present invention permits a decrease in the cake height compared to the prior art hold-down device, for any operating conditions.

The height of the sidewall 19 and the lip 47 are not drawn to scale in FIG. 10 relative to the sidewall 17. The sidewall 17 is sufficiently high so that the lower-most portion of support member 48 lies just atop the upper-most portion of the lip 47 of an adjacent filter pan 3.

Figure 11:
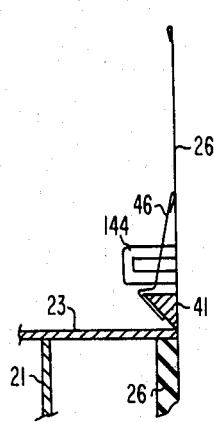
FIG. 11 is a cross-sectional view showing an end wall and hold-down device as taken along line 11—11 of FIG. 5.

FIG. 11 is a side view, partially in section, showing the end wall 26 and a projecting loop member 44 attached thereto, as taken along line 11—11 of FIG. 5. Support members 50, 51 are visible for supporting the plate 23 as seen in FIG. 11. Another insert member 41 is seen in FIG. 11, having the same cross-sectional shape as those used for the sidewalls. The finger 46 is attached at its upper-most portion to the end wall 26, as by welding, riveting, or the like.

The end wall 26 is vertical relative to the member 23, as seen in FIG. 11. The end wall 27, not shown in FIG. 11, is also vertical and also has projecting members 44 for anchoring an insert member 41 so as to stretch the fabric 16 to the end walls. As discussed hereinabove with reference to the preceding figures, the fabric 16 is tensioned to the sidewalls as well as to the end walls.

Figure 12:
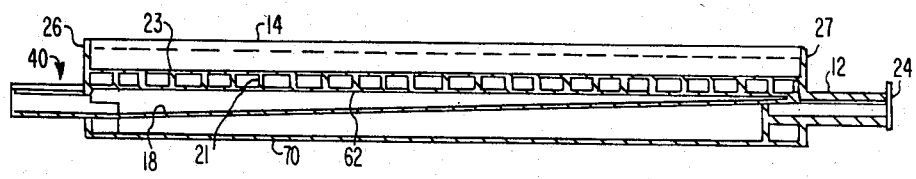
FIG. 12 is a longitudinal cross-sectional view of the filter pan of the present invention as taken along line 12—12 of FIG. 5.

FIG. 12 is a cross-sectional view of the filter pan 3 according to the present invention, as taken along line 12—12 of FIG. 5. Here, the sloped bottom wall 18 is clearly seen in outline as sloping toward the conduit 40.

This sloping increases fluid flow as compared to a completely horizontal wall. This increased slope improves drainage and facilitates efficient filtration. As discussed hereinabove, the increased slope is made possible by the fact the filter surface is spaced at a greater distance from the tilt axis of the pan, which in turn is made possible by the improved pan shape. In the present invention, the filter surface can be spaced a greater distance from the pan tilt axis without causing interference between adjacent pans during tilting. The lower-most wall 70 is seen in cross section in FIG. 12 as being completely horizontal. The termination point of the shaft 12 is seen in FIG. 12. Also, the upstanding end walls 26, 27 are seen in this figure. Also as seen in FIG. 12, the individual ribs 50 are sandwiched between the plate 23 and another plate 62 which underlies the plate 23 in FIG. 12.

The improved filter pans of the present invention are capable of achieving the above-described advantages and results and while preferred embodiments of the present invention have been disclosed, it will be understood that it is not limited thereto but may otherwise embodied within the scope of the following claims.

What is claimed is:

1. A filter pan for use in a continuous filter system comprising:
   a pan body having a parallelorgram-shaped cross-section;
   a filtering medium within said pan body adapted to filter particulate material from a slurry;
   a leading side wall and a trailing side wall being generally parallel to one another in said cross-section, with a first end wall means and a second end wall means within said pan body, said first end wall means and said second end wall means, together with said leading side wall and said trailing side wall, being generally planar and forming:
   (i) an enclosure for retaining particulate material above said filtering medium and
   (ii) a liquid collection region for collecting liquid filtered by said filtering medium;
   said leading side wall being oriented at a predetermined angle to a direction of travel of said leading side wall, said predetermined angle being an oblique angle of a least about 8° from the vertical axis of said pan body;
   said trailing side wall being disposed at said predetermined angle to the direction of travel of said trailing side wall and from the vertical axis of said pan body;
   an outlet in said pan body for liquid collected by said liquid collection region;
   a means for rotating said pan body about an axis of rotation offset from a gravitational center of said pan body: and
   whereby increased filtration capacity results from the pan body.

2. A filter pan as claimed in claim 1, wherein said filtering medium further comprises a support member and a flexible filter supported thereon.

3. A filter pan as claimed in claim 2, further comprising a means for stretching said flexible filter across said support.

4. A filter pan as claimed in claim 3, wherein said means for stretching comprises a plurality of hold-down members;
   and a plurality of retaining bodies;
   each of said plurality of retaining bodies being adapted to be received by respective ones of said plurality of hold-down members;
   each of said plurality of retaining bodies being adapted to retain a portion of said flexible filter against one of the walls of said pan body;
   whereby said flexible filter is retained against said pan body.

5. A filter pan as claimed in claim 4, wherein at least one of said plurality of retaining bodies is elongated and has a generally constant, triangular cross-sectional shape.

6. A filter pan as claimed in claim 1, wherein said filtering medium is spaced from said pan axis;
   whereby increased drainage flow rates results and filtration efficiency is improved.

7. A continuous filtering system, comprising:
   a plurality of filter pans;
   a means for moving each of said plurality of said filter pans in a closed path;
   a means for supplying a slurry to each of said filter pans consecutively; each of said filter pans having a parallelogram-shaped cross-section, and including a pan body and a filtering medium supported by said pan body adapted to filter particulate material from a slurry
   each of said plurality of filter pans having a leading side wall and a trailing side wall being generally parallel to one another in said cross-section, with a first end wall means and a second end wall means, said first end wall means and said second end wall means, together with said leading side wall and said trailing side wall, being generally planar and forming:
   (i)and enclosure for retaining particulate material above said filtering medium and
   (ii) a liquid colection region for collecting liquid filtered by said filtering medium; wherein each pair of adjacent filter pans are arranged such that said trailing side wall of a first filter pan is adjacent said leading side wall of a second filter pan; said leading side wall of said second filter pan being generally parallel to said trailing side wall of said first filter pan and being separated therefrom by a predetermined clearance space;
   said leading side wall being oriented at a predetermined angle to a direction of travel of said leading side wall, said predetermined angle being an oblique angle of a least about 8° from the vertical axis of said pan body:
   said trailing side wall being disposed at said predetermined angle to the direction of travel of said trailing side wall and from the vertical axis of said pan body;
   a means for tilting each of said filter pans about a pan axis to invert each of said plurality of filter pans consecutively;
   an outlet in said filter pans for liquid collected by said liquid collection region;
   a means for rotating said filter pans about an axis of rotation offset from a gravitational center of each of said filter pans; and
   wherein inversion of each of said filter pans discharges accumulated particulate material filtered from said slurry.

8. A continuous filtering system as claimed in claim 7, wherein said closed path generally comprises a circular path.

9. A continuous filtering system as claimed in claim 7, wherein said filtering medium further comprises a liquid-pervious support member and a flexible filter supported thereon.

10. A continuous filtering system as claimed in claim 9, further comprising a means for stretching said flexible filter across said support.

11. A continuous filtering system as claimed in claim 9, wherein said means for stretching comprises a plurality of hold-down members and a plurality of retaining bodies;
   each of said plurality of retaining bodies being adapted to be received by respective ones of said plurality of hold-down members;
   each of said plurality of retaining bodies, when received by respective ones of said plurality of hold-down members, being adapted to retain a portion of said flexible filter against one of the walls of said pan body;
   whereby said flexible filter is retained against the walls of said pan body.

12. A continuous filtering system as claimed in claim 7, wherein said clearance space is approximately one inch.

13. A continuous filtering system as claimed in claim 7, wherein said filtering medium is spaced from said pan axis;
   whereby increased drainage flow rates results and filtration efficiency is improved.

14. A filter pan for use in a continuous filter system comprising:
   a pan body having a parallelogram-shaped cross-section;
   a filtering medium within said pan body adapted to filter particulate material from a slurry;
   a leading side wall and a trailing side wall being generally parallel to one another in said cross-section, with a first end wall means and a second end wall means within said pan body, said first end wall means and said second end wall means, together with said leading side wall and said trailing side wall, being generally planar and forming:
      (i) an enclosure for retaining particulate material above said filtering medium and
      (ii) a liquid collection region for collecting liquid filtered by said filtering medium;
   said leading side wall being oriented at about an 8° to about a 15° angle from the vertical axis of said pan body;
   said trailing side wall being disposed at about said 8° to about said 15° angle from the vertical axis of said pan body;
   an outlet for liquid collected by said liquid collection region; and
   a means for rotating said pan body about an axis of rotation offset from a gravitational center of said pan body.

15. A filter pan as claimed in claim 14, wherein said filtering medium further comprises a support member and a flexible filter supported thereon.

16. A filter pan as claimed in claim 15, further comprising a means for stretching said flexible filter across said support.

17. A filter pan as claimed in claim 16, wherein said means for stretching comprises a plurality of hold-down members;
   and a plurality of retaining bodies;
   each of said plurality of retaining bodies being adapted to be received by respective ones of said plurality of hold-down members;
   each of said plurality of retaining bodies being adapted to retain a portion of said flexible filter against one of the walls of said pan body; and
   whereby said flexible filter is retained against said pan body.

18. A filter pan as claimed in claim 17, wherein at least one of said plurality of retaining bodies is elongated and has a generally constant, triangular cross-sectional shape.

19. A filter pan as claimed in claim 14, wherein said filtering medium is spaced from said pan axis;
   whereby increased drainage flow rates result and filtration efficiency is improved.

20. A continuous filtering system, comprising:
   a plurality of filter pans;
   a means for moving each of said plurality of said filter pans in a closed path;
   a means for supplying a slurry to each of said filter pans consecutively; each of said filter pans having a parallelogram-shaped cross-section, and including a pan body and a filtering medium supported by said pan body adapted to filter particulate material from a slurry
   each of said plurality of filter pans having a leading side wall and a trailing side wall being generally parallel to one another in said cross-section, with a first end wall means and a second end wall means, said first end wall means and said second end wall means, together with said leading side wall and said trailing side wall, being generally planar and forming:
      (i) and enclosure for retaining particulate material above said filtering medium and
      (ii) a liquid colection region for collecting liquid filtered by said filtering medium; wherein each pair of adjacent filter pans are arranged such that said trailing side wall of a first filter pan is adjacent said leading side wall of a second filter pan; said leading side wall of said second filter pan being generally parallel to said trailing side wall of said first filter pan and being separated therefrom by a predetermined clearance space;
   said leading side wall being oriented at about a 15° angle from the vertical axis of said pan body;
   said trailing side wall being disposed at about said 15° angle from the vertical axis of said pan body;
   a means for tilting each of said filter pans about its axis to invert each of said filter pans consecutively;
   an outlet in said pan body for liquid collected by said liquid collection region;
   a means for rotating each of said filter pans about its axis of rotation offset from a gravitational center of each of said filter pans; and
   wherein inversion of each of said filter pans discharges accumulated particulate material filtered from said slurry.

* * * * *